Figure 1:
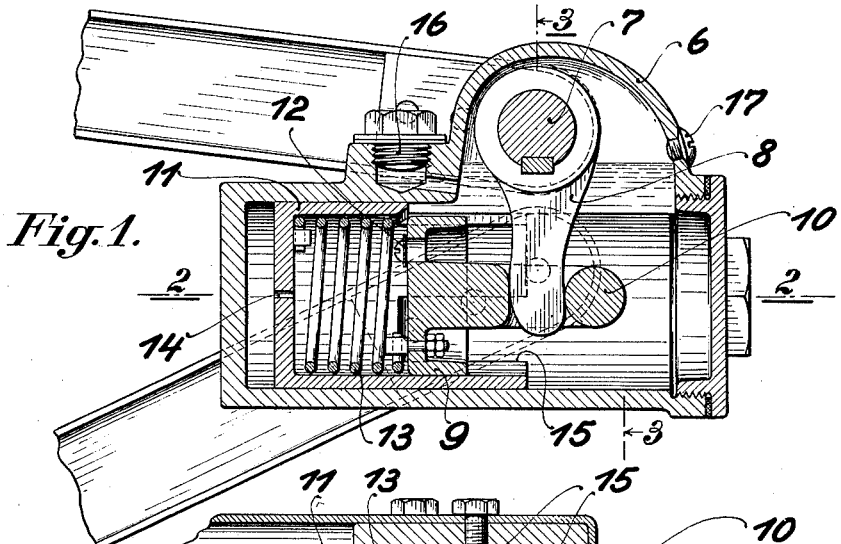

July 21, 1925.

E. MOLDENHAUER

SHOCK ABSORBER FOR MOTOR VEHICLES

Filed Jan. 23, 1925

1,546,988

Inventor

Erich Moldenhauer

Patented July 21, 1925.

1,546,988

UNITED STATES PATENT OFFICE.

ERICH MOLDENHAUER, OF DUSSELDORF, GERMANY.

SHOCK ABSORBER FOR MOTOR VEHICLES.

Application filed January 23, 1925. Serial No. 4,320.

*To all whom it may concern:*

Be it known that I, ERICH MOLDENHAUER, a citizen of Germany, and a resident of 64 Graf-Adolf-Strasse, in the city of Dusseldorf, Germany, have invented certain new and useful Improvements in Shock Absorbers for Motor Vehicles, of which the following is a specification.

This invention has reference to shock absorbers for the dampening and softening of the shocks resulting from the thrusts, jerks and the like produced upon the wheels and axles of vehicles, and it refers in particular to motor vehicles, though it is not limited thereto, and it is one of the important objects of this invention to improve the operation and facilitate the manufacture of devices of the kind referred to, and to produce a more thorough, softer and more reliable action than it was possible to obtain with such devices, as heretofore constructed. The majority of the shock absorbing devices for motor vehicles heretofore employed operate substantially by producing a braking action upon the oscillations of the axles of the vehicle in both directions. Such dampening or shock absorbing means, however, present the inconvenience of operating like a hard spring, and in view thereof shock absorbing means have also been suggested in which the dampening action is caused to operate in but one direction of movement of the spring or of the axle. Yet, even these shock absorbers or dampeners fail to accomplish the desired object, inasmuch as, in case they produce a dampening of the ascending axle the vehicle is subject to violent shocks upon moving along an elevated part of the road or over a stone, while, on the other hand, if intended to dampen the descent of the axle, the vehicle after the elevation of the axle on moving over an elevation of the road, will drop down with the axle or with the wheel for the entire amount of the rise, because the wheel, on account of the dampening action, is unable to be moved by the release of the spring in advance of the dropping vehicle. The descent and dropping movement of the vehicle is therefore not arrested by the spring, so that the vehicle with the upwardly pushed wheels is caused to impinge with a violent motion against the road.

It is the object of my invention to overcome the difficulties referred to, inasmuch as in the shock absorber according to this invention the axle is only caught upon descent from the balancing position, so that the spring motion is dampened upon the release of the spring from this balancing position, and in consequence thereof the wheel, when moving along an elevation on the road, is free to be raised and to be lowered to its balancing or equilibrium position. On the other hand, upon the movement of the vehicle along a depression of the road the wheel is prevented from dropping into the same, and from being violently thrust upwards at the edge of the cavity, but the wheel in accordance with my invention remains suspended in the balancing position on the vehicle, while it jumps over the depression, and is therefore enabled to continue its rolling movement without being subject to any substantial shock or jerking movement. In case the axle should oscillate very much up and down it will be sufficient for dampening this oscillating movement to apply a braking action upon a descent below the balancing position, because the backward oscillation will then also be accordingly shortened, so as to overcome the upwardly moving tendency beyond the balancing position. In further pursuance of my invention means are provided in connection with the shock absorber for automatically adapting itself to the varying loads of the vehicles in such a manner that its balancing position adjusts itself to correspond to the modification of the loading of the vehicle. Upon the loading of the vehicle the descending movement of the wheel axle is therefore always dampened relatively to the balancing position. As regards the operation of the new shock absorber, it may be caused to act by any suitable means, thus for instance, by means of mechanical friction or by a braking liquid.

Figure 2:
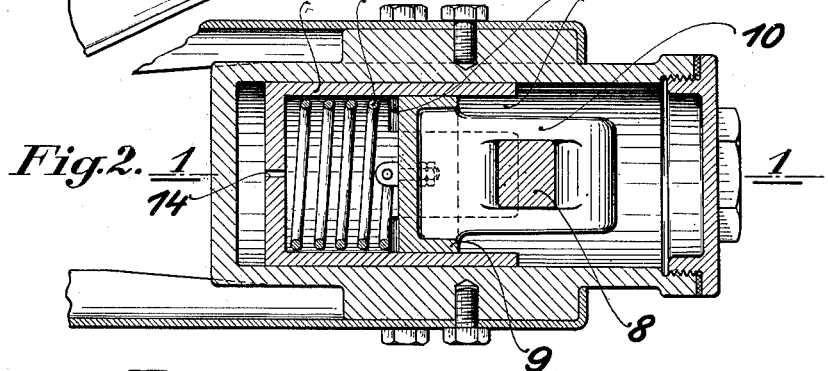
Figure 3:
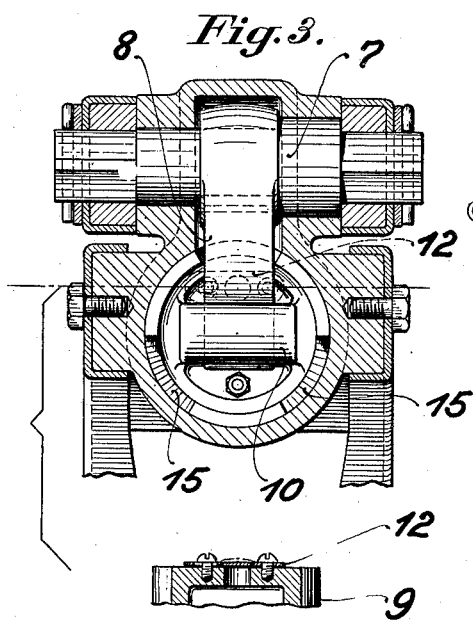
Figure 4:
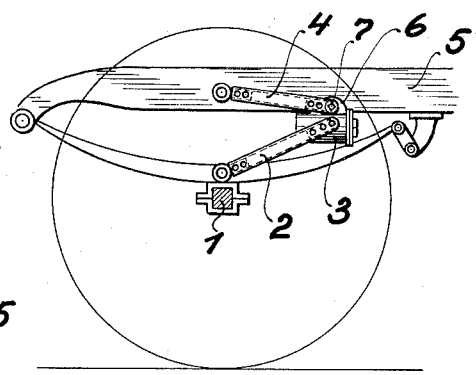

Upon the accompanying drawing a form of embodiment of the invention is shown by way of example employing a braking liquid, without however limiting the invention to this embodiment. In the drawings: Figure 1 is a vertical section; Figure 2 is a horizontal section; Figure 3 is a transverse section, and Figure 4 illustrates the mounting of the shock absorber on a vehicle.

Upon the wheel axle 1 a lever 2 is rotatably secured which is fixedly connected to a cylinder 3 filled with oil or the like. Another lever 4 is rotatably mounted on the vehicle frame 5, and is also rotatably journaled in a compartment 6 of the cylinder 3. In the compartment 6 the rotating shaft 7 is disposed to which the cam shaped lever 8 is keyed which is rocked in consequence of the shear-like movements of the levers 2 and 4 relatively to each other which are produced by shocks, jerks and the like during the movement of the vehicle. By this rocking movement the lever 8 operates the piston 9 by means of an eye 10 in engagement with the lever 8 and secured to a second piston 11 mounted in the cylinder 3. The piston bottom 9 is provided with a check valve 12. The other piston 11 is connected to the braking piston 9 by a spring 13. The piston 11 possesses a narrow aperture 14 in the bottom or it is fitted into the cylinder 3 in such a manner that it is adapted to become slowly displaced by the tension or pressure of the spring 13. At its open end the piston 11 is provided with recesses 15 which upon the movement of the piston 9 in the piston 11 are covered up in such a manner that the cavity of the piston 11 can be closed with relation to the right hand portion of the cylinder. The screw 16 serves for charging the cylinder 3 with oil, and the screw 17 serves as a venting means.

The rapid movements of the wheel axle in the vertical direction can only be dampened by the piston 9 upon its being moved from the balancing position shown in Figure 1 towards the left, because it will then cover up the recesses 15 and prevent the passage of the braking liquid. Upon return of the piston the check valve 12 is opened. Inasmuch as the piston 11 can only be slowly displaced, because its movement is counteracted by the braking action of the liquid, it cannot be quickly withdrawn during the rapid braking movement of the piston 9, and the liquid is therefore throttled by the closing of the recesses 15. Upon changing the load on the vehicle, however, the piston 9 will assume a correspondingly changed balancing position. The spring 13 is therefore compressed or stretched in accordance with the reduction or increase of the load on the vehicle. In this manner the spring is given a tensional force which slowly pushes the piston 11 forward, so that it again assumes the same distance from the piston 9 as before, and the edge of the piston resumes the same relative position with regard to the recesses, which regulates the commencement of the dampening action.

The invention is not restricted to the particular embodiment herein shown and described by way of exemplification only, the construction and arrangement of parts being susceptible of variation to meet the various requirements of use, no limitations other than are imposed by the scope of the appended claims being intended, and the invention is not restricted to motor vehicles, but admits of general application to vehicles where similar conditions prevail.

I claim:—

1. In a shock absorber, a fluid-containing casing, a hollow piston therein, a power piston operable in the hollow piston, a cushioning member between the two pistons permitting movement of the power piston in the hollow piston to compress the cushioning member, and means for slowly equalizing the fluid pressure on opposite sides of the hollow piston to permit the latter being moved by the compressed cushioning member toward reestablishing the normal relation between the two pistons.

2. A shock absorber according to claim 1 characterized by the fact that said pressure equalizing means consists of a restricted passage through the hollow piston.

3. A shock absorber according to claim 1 characterized by the fact that said pressure equalizing means consists of a restricted passage through the hollow piston, and the latter having a pressure-releasing passage normally uncovered by the power piston and adapted to be covered thereby upon the power stroke of said power piston.

4. A shock absorber comprising a cylinder, a compound piston therein including a power element and a driven element yieldably spaced from the power element for compressing fluid in advance thereof, and means for retardingly equalizing the fluid pressure on opposite sides of the yieldable driven element.

5. In a shock absorber for vehicles and the like, a wheel axle, a vehicle frame, a braking cylinder, a braking and dampening piston in said cylinder, and self-adjusting cushioning means in the cylinder, engageable with the piston, and operative connection between the frame and the piston, and the piston and the axle.

6. In a shock absorber for vehicles and the like, a vehicle frame, a wheel axle, a liquid-charged braking cylinder, a displaceable piston in the cylinder, operatively connected to the axle and to the frame, a hollow cushioning piston, telescopingly and spring actingly connected to the other piston, and venting means on the hollow piston engageable with the other piston and adapted to be closed and uncovered thereby.

7. In a shock absorber for vehicles and the like, a wheel axle, a vehicle frame, a liquid-charged braking cylinder, a slowly movable hollow outer cushioning piston in said cylinder, an inner braking piston, telescopingly and spring actingly movable in the outer piston, and operatively connected to the wheel axle and the frame, and regulatable venting means on the outer piston, adapted for engagement with the inner piston.

8. In a shock absorber for vehicles and the like, a vehicle frame, a wheel axle, a braking cylinder operatively connected to the frame and the axle, and dampening means in said cylinder, capable of automatic adaptation to the varying loading of the vehicle.

9. In a shock absorber for vehicles and the like, a vehicle frame, a wheel axle, a liquid charged braking cylinder, a braking piston therein operatively connected to the axle and the frame, and means to cause the braking movement of the piston to be throttled by the liquid from a certain position.

ERICH MOLDENHAUER.